United States Patent [19]
Hosono et al.

[11] Patent Number: 5,768,153
[45] Date of Patent: Jun. 16, 1998

[54] METHOD OF AND APPARATUS FOR PRODUCTION MANAGEMENT

[75] Inventors: Takeshi Hosono; Osamu Yamada; Hiromi Kaneko, all of Fujinomiya, Japan

[73] Assignee: Fuji Photo Film Co., Ltd., Kanagawa, Japan

[21] Appl. No.: 712,965

[22] Filed: Sep. 12, 1996

[30] Foreign Application Priority Data

Sep. 14, 1995 [JP] Japan .................................. 7-236509

[51] Int. Cl.$^6$ .................................................. G06F 19/00
[52] U.S. Cl. ............... 364/552; 364/468.17; 364/468.22; 364/478.14
[58] Field of Search .................... 364/552, 468.16, 364/468.17, 468.19, 468.22, 468.23, 478.13, 478.14, 478.15, 478.16

[56] References Cited

U.S. PATENT DOCUMENTS

| 4,351,030 | 9/1982 | Astfalk et al. ................... 364/552 |
|---|---|---|
| 4,709,337 | 11/1987 | Knapp et al. ................... 364/468.17 |
| 4,972,326 | 11/1990 | Jung et al. ................... 364/552 |
| 5,086,397 | 2/1992 | Schuster et al. ................... 364/468.17 |
| 5,088,045 | 2/1992 | Shimanaka et al. ................... 364/468.17 |
| 5,341,304 | 8/1994 | Sakamoto et al. ................... 364/468.17 |
| 5,347,463 | 9/1994 | Nakamura et al. ................... 364/478.14 |
| 5,381,340 | 1/1995 | Ueda et al. ................... 364/552 |
| 5,383,135 | 1/1995 | Shofner et al. ................... 364/552 |
| 5,434,790 | 7/1995 | Saka et al. ................... 364/468.17 |
| 5,555,504 | 9/1996 | Lepper et al. ................... 364/468.22 |

*Primary Examiner*—Eric W. Stamber
*Attorney, Agent, or Firm*—Sughrue, Mion, Zinn, Macpeak & Seas, PLLC

[57] ABSTRACT

Quality information with respect to a product in a second processed state is generated from quality information produced when a product in a first processed state is produced, using a processing condition for the product in the second processed state. A process to be effected on the product in the second processed state is automatically determined according to the generated quality information for thereby efficiently managing the production of the product.

14 Claims, 9 Drawing Sheets

FIG. 2A

PRODUCTION INDICATION INFORMATION

| a1: CUTTING PRODUCTION INDICATION INFORMATION |
| --- |
| a2: INTERNAL PACKAGE PRODUCTION INDICATION INFORMATION |
| a3: EXTERNAL PACKAGE PRODUCTION INDICATION INFORMATION |
| a4: QUALITY INFORMATION |
| a5: PRINT INFORMATION |
| a6: CONVEYANCE INDICATION INFORMATION |

FIG. 2B

PRODUCTION ACHIEVEMENT INFORMTION

| b1: CUTTING ACHIEVEMENT INFORMATION |
| --- |
| b2: INTERNALLY PACKAGING ACHIEVEMENT INFORMATION |
| b3: EXTERNALLY PACKAGING ACHIEVEMENT INFORMATION |
| b4: PALLETIZING ACHIEVEMENT INFORMATION |

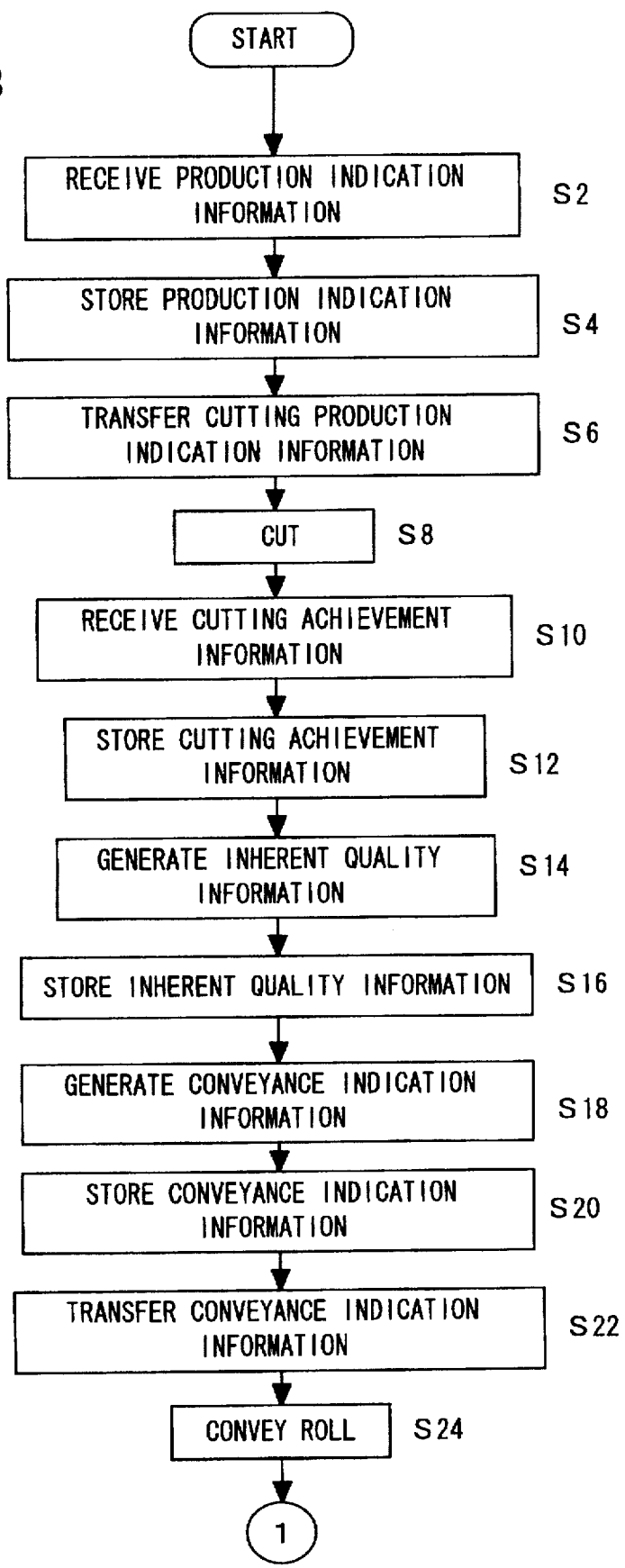

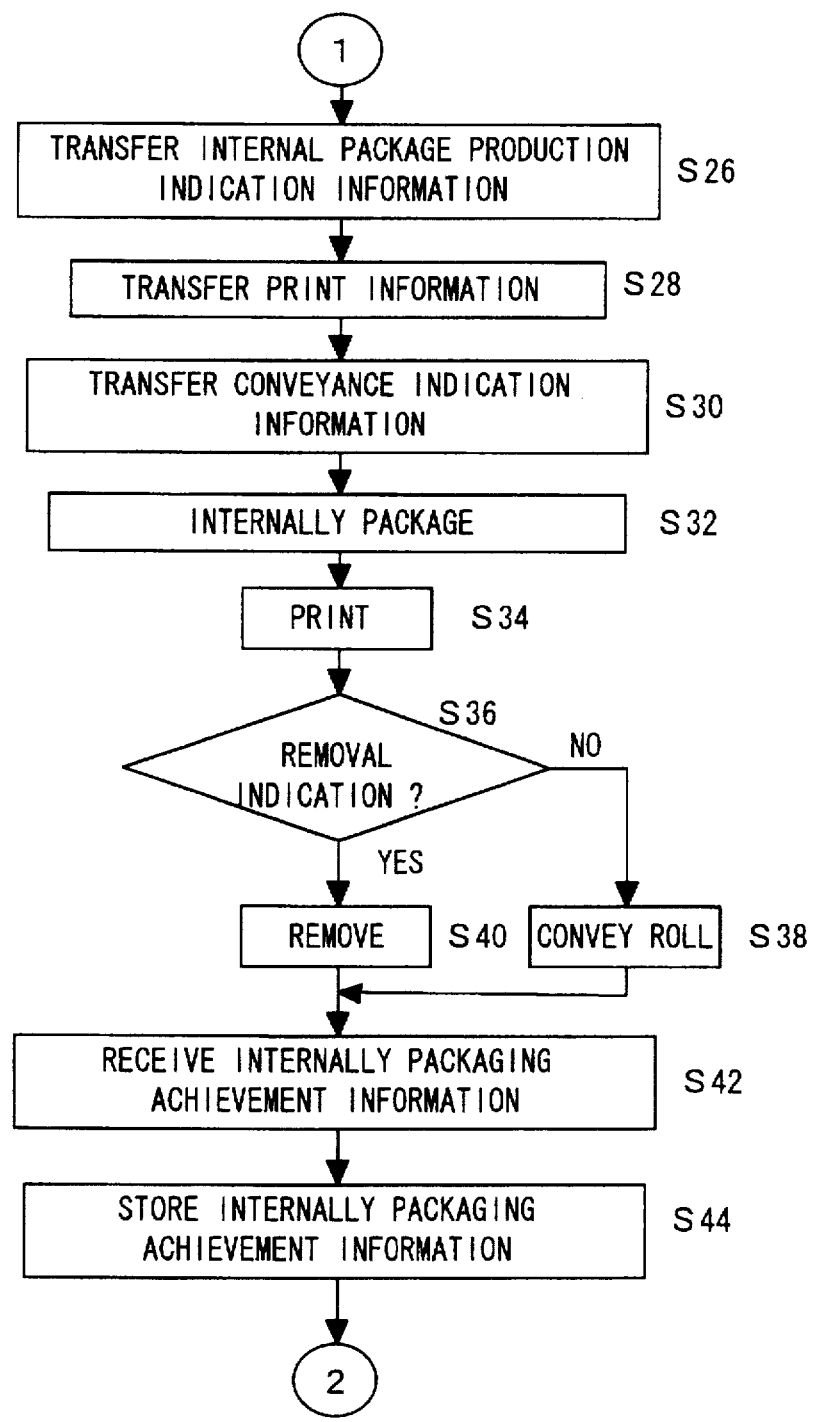

FIG. 7

QUALITY INFORMATION a4

| BLANK ROLL NUMBER |
|---|
| H-W |
| FAILURE (SAMPLING) |

FIG. 8

INHERENT QUALITY INFORMATION

| INHERENT NAME |
|---|
| n-m |
| h-w |
| H-W |
| FAILURE (SAMPLING) |

FIG. 10

CONVEYANCE INDICATION INFORMATION a6

| n-m |
|---|
| INTERNALLY PACKAGED PRODUCT REMOVAL |
| FAILURE INSPECTION |
| FAILURE |

FIG. 11

| COMMERCIAL NAME |
|---|
| ABCDE12345 |
| 01-04 |
| 4.5cm-135.0m |
| 32.5cm-260m |
| FAILURE |

METHOD OF AND APPARATUS FOR PRODUCTION MANAGEMENT

BACKGROUND OF THE INVENTION

1. Field of the Invention:

The present invention relates to a method of and an apparatus for production management to determine the quality information of a product in a second processed state from the quality information of a product in a first processed state and manage the determined quality information.

2. Description of the Related Art:

On a production line for producing rolls of a photosensitive material, a base of a photosensitive material is produced in the form of a strip-shaped sheet, and thereafter coated with a photosensitive emulsion, thereby producing a blank roll. The blank roll is then cut into separate rolls of given size. The separate rolls are individually packaged in respective packages, which are then stored in a container box for shipment.

It is impossible to fully avoid the production of defective rolls of the photosensitive material. For example, when a blank roll is produced, the coating of the photosensitive emulsion may suffer layer irregularities or dust deposits. In order to keep a desired level of product quality on the above production line, therefore, it is necessary to remove defective rolls or sample produced rolls for inspection.

Product defects may be spotted and processed in an upstream inspection station on the production line. For example, a portion of a blank roll which suffers a dust deposit may be spotted in the blank roll production stage, and information indicative of such a spotted portion may be transmitted to the downstream roll cutting stage, where only a cut roll which includes the spotted portion can be rejected based on the transmitted information. This defect removal process is much more economical than if the entire blank roll were removed as containing the defective portion.

Manual generation and management of defect information is highly tedious and time-consuming, and may possibly lead to the creation of wrong defect information. For example, since the production line for producing rolls of a photosensitive material is installed in a dark room, the efficiency of the production line is poor, and a process of manually generating and managing defect information on the production line is highly difficult to carry out. A defect portion spotted on a blank roll has to be manually identified as related to a particular cut roll, and its information needs to be printed if necessary. However, the information may possibly be produced in error because of the manual process in the dark room.

SUMMARY OF THE INVENTION

It is a general object of the present invention to provide a method of and an apparatus for production management to generate quality information relative to products manufactured on a production line for thereby efficiently managing the products and the production line.

A major object of the present invention is to provide a method of and an apparatus for production management to decide whether a manufactured product is defective or not and whether it is a sampled product or not based on the quality information of a product in a condition prior to the processing of the product for thereby efficiently processing the above product.

The above and other objects, features and advantages of the present invention will become more apparent from the following description when taken in conjunction with the accompanying drawings in which a preferred embodiments of the present invention is shown by way of illustrative example.

BRIEF DESCRIPTION OF THE DRAWINGS

FIG. 2A is a diagram of production indication information;

FIG. 2B is a diagram of production achievement information; FIGS. 3 through 5 are flowcharts of a processing sequence carried out by the method of and the apparatus for production management according to the present invention;

FIG. 7 is a diagram of quality information;

FIG. 8 is a diagram of inherent quality information;

FIG. 10 is a diagram of conveyance indication information; and

FIG. 11 is a diagram of printed information.

DETAILED DESCRIPTION OF THE PREFERRED EMBODIMENT

Figure 1:
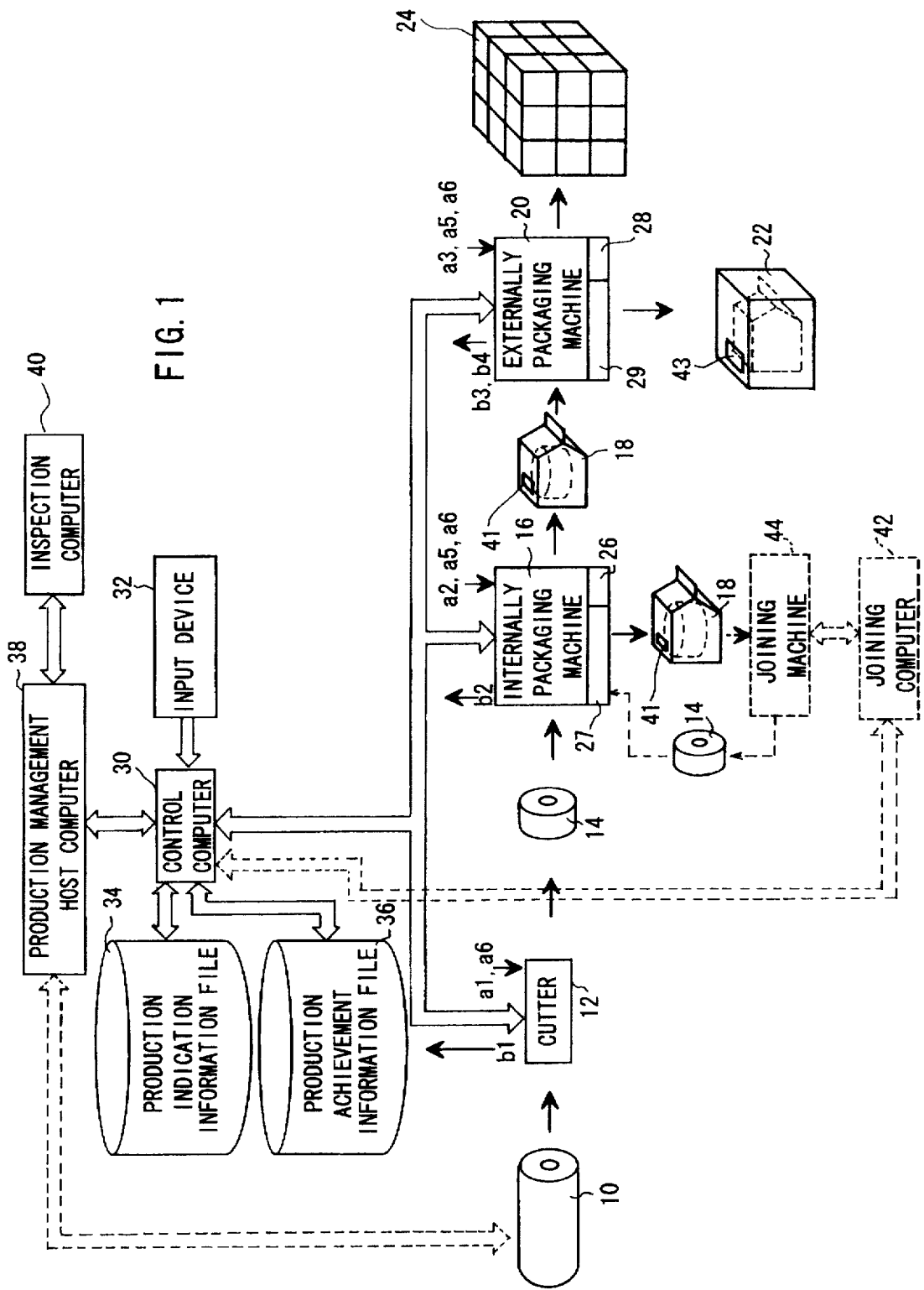
FIG. 1 is a schematic view, partly in block form, of a photosensitive material production system which incorporates a method of and an apparatus for production management according to the present invention.

FIG. 1 schematically shows a photosensitive material production system which incorporates a method of and an apparatus for production management according to the present invention.

In the photosensitive material production system, a cut roll 14 having a desired length and width is produced by a cutting machine 12 from a blank roll 10, which is an intermediate product, comprising a base of a photosensitive material coated with a photosensitive emulsion. The cut roll 14 is then packaged into a packaged product 18 by an internally packaging machine 16, and the packaged product 18 is thereafter packaged into a boxed product 22 by an externally packaging machine 20. Boxed products 22 are classified according to type and destination and assembled into a palletized product 24 for shipment.

The internally packaging machine 16 has a printer 26 for printing predetermin ed print information on the packaged product 18, and a removal mechanism 27 for removing the packaged product 18 which is indicated according to production indication information (described later on). The externally packaging machine 20 also has a printer 28 for printing predetermined print information on the boxed product 22, and a removal mechanism 29 for removing the boxed product 22 which is indicated according to the production indication information.

The photosensitive material production system has a control computer 30 for controlling and managing the cutting machine 12, the internally packaging machine 16, the externally packaging machine 20, the printers 26, 28, and the removal mechanisms 27, 29. To the control computer 30, there are connected an input device 32 for entering various information including production indication information and other information, a production indication information file 34 for storing the production indication information, a production achievement information file 36 for storing production achievement information relative to manufactured products and conveyance indication information (described later on), and a production management host computer 38 for controlling the photosensitive material production system in its entirety. An inspection computer 40 for processing the production achievement information transferred from the control computer 30 and providing desired information to an inspector is connected to the production management host computer 38. The production indication information file 34 functions as a first quality information managing means, the control computer 30 functions as a second quality information generating means, and the production achievement information file 36 functions as a product processing managing means.

As shown in FIG. 2A, the production indication information comprises cutting production indication information a1, internal package production indication information a2, external package production indication information a3, quality information a4, print information a5, and conveyance indication information a6.

The cutting production indication information a1 is transferred to the cutting machine 12 for controlling operation of the cutting machine 12. The cutting production indication information a1 includes information about the length, width, and number of cut rolls 14 produced from the blank roll 10 of the type indicated according to a production plan. The internal package production indication information a2 is transferred to the internally packaging machine 16 for controlling operation of the internally packaging machine 16, the printer 26, and the removal mechanism 27. The external package production indication information a3 is transferred to the externally packaging machine 20 for controlling operation of the externally packaging machine 20, the printer 28, and the removal mechanism 29.

The quality information a4 comprises quality information of the blank roll 10 which has been obtained when the blank roll 10 was produced, i.e., information indicative of what failure (defect) occurs in which position of the blank roll 10, and sampling information indicative of which position of the blank roll 10 a photosensitive material is to be removed from for the purpose of quality management. The quality information a4 is supplied from the production management host computer 38 or the input device 32, if necessary, to the control computer 30.

The print information a5 is transferred to the printers 26, 28 for being printed on the packaged product 18 and the boxed product 22, and represents the commercial name, the production lot number, etc. of each of the packaged product 18 and the boxed product 22.

The conveyance indication information a6 is transferred to the cutter 12, the internally packaging machine 16, and the externally packaging machine 20 for indicating destinations to which the cut roll 14, the packaged product 18, the boxed product 22 are to be conveyed. The conveyance indication information a6 includes inherent print information for printing whether the cut roll 14 has a failure or not or whether the cut roll 14 is a sampled roll or not, on the cut roll 14.

As shown in FIG. 2B, the production achievement information comprises cutting achievement information b1, internally packaging achievement information b2, externally packaging achievement information b3, and palletizing achievement information b4.

The cutting achievement information b1 includes information indicative of the inherent name of the cut roll 14 produced by the cutter 12, the length by which the blank roll 10 has been unreeled before it is cut, and inherent quality information of the cut roll 14 which is obtained from the length by which the blank roll 10 has been unreeled and the quality information a4 of the blank roll 10. The internally packaging achievement information b2 includes information indicative of the inherent name of the packaged product 18 and the quality information of the packaged product 18. The externally packaging achievement information b3 includes information indicative of the inherent name of the boxed product 22 and the quality information of the boxed product 22. The palletizing achievement information b4 includes information indicative of the inherent name of the palletized product 24 and the quality information of the palletized product 24.

Figure 5:
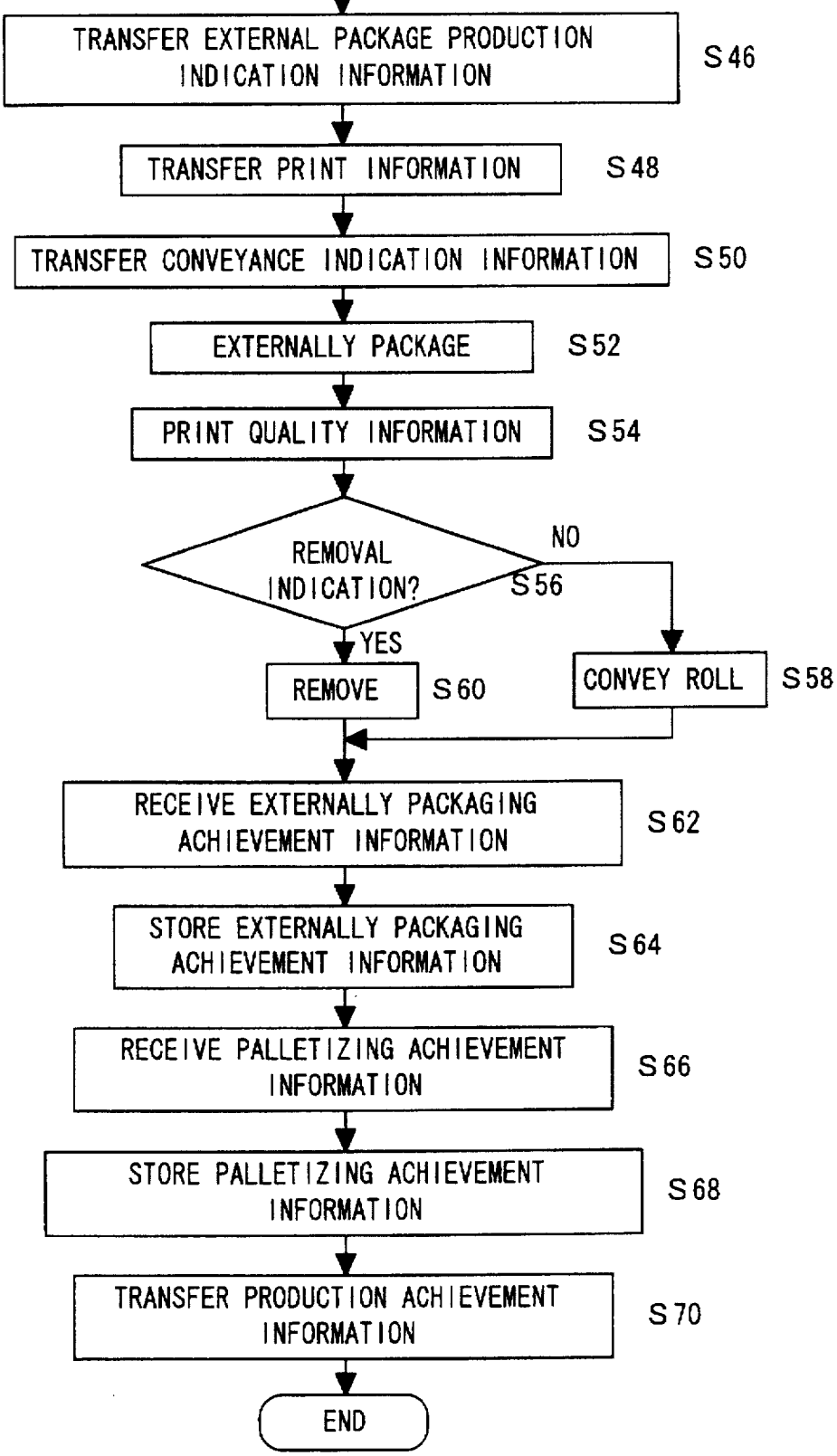

The method of production management according to the present invention, which is carried out by the photosensitive material production system, will be described below with reference to FIGS. 3 through 5.

The control computer 30 receives production indication information relative of a photosensitive material production plan of the day from the production management host computer 38 or the input device 32 in a step S2, and stores the received production indication information in the production indication information file 34 in a step S4. The production indication information includes the quality information a4, i.e., information indicative of what failure (defect) occurs in which position of the blank roll 10, and sampling information indicative of which position of the blank roll 10 a photosensitive material is to be removed from for the purpose of quality management. If a failure (defect) location or a sampled location is a location in the blank roll 10 shown in FIG. 6, then the quality information a4 includes the number of the blank roll 10, a longitudinal position H and a transverse position W of the location, as shown in FIG. 7, and information representative of whether the blank roll 10 has a failure or not and whether it is a sampled product or not.

Then, the control computer 30 transfers the cutting production indication information a1 including division size information, of the production indication information, to the cutter 12 in a step S6. The cutter 12 unreels the blank roll 10 and cuts it into a cut roll 14 having a predetermined length and width according to the cutting production indication information a1 in a step S8. Then, the cutter 12 transfers information indicative of the length and width of the blank roll 10 which has thus been cut, as the cutting achievement information b1 to the control computer 30 in a step S10.

Figure 6:
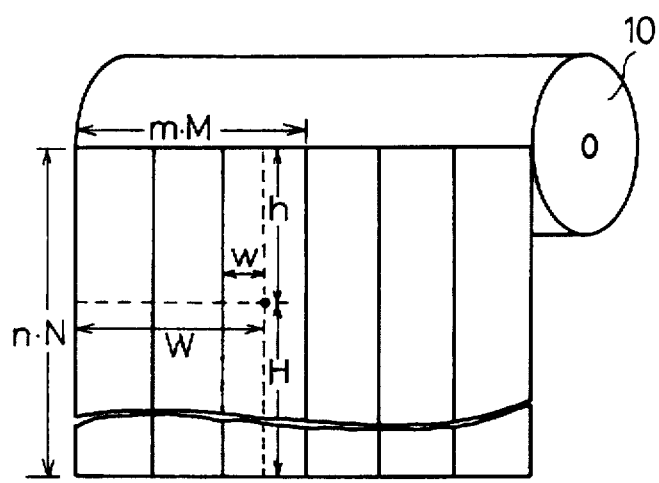
FIG. 6 is a view of a defective portion of a blank roll.
Figure 9:
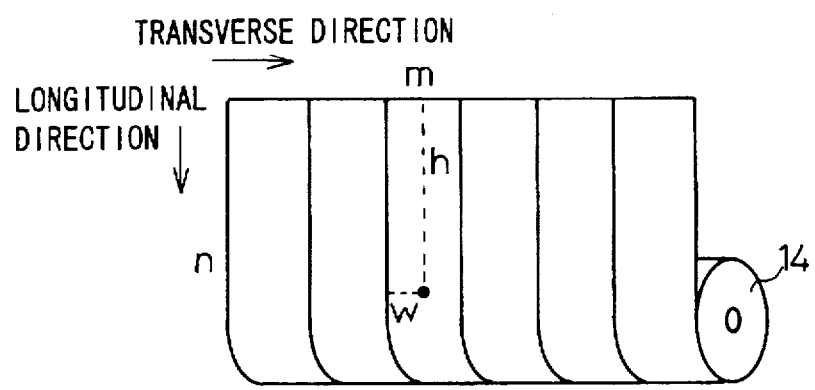
FIG. 9 is a view of a defective portion of a cut roll.

The control computer 30 stores the cutting achievement information b1 in the production achievement information file 36 in a step S12, and generates inherent quality information relative to the cut roll 14 in a step S14. As shown in FIG. 8, the inherent quality information includes the inherent name of the cut roll 14, longitudinal and transverse unit numbers n, m of the cut roll 14 with respect to the blank roll 10, which are obtained from the cutting achievement information b1, positional information "h–w" of a failure or sampling location in the cut roll 14, which is obtained from the quality information a4 and the cutting achievement information b1, positional information "H–W" of a failure or sampling location in the blank roll 10, and information indicative of whether the cut roll 14 has a failure or not and whether it is a sampled product or not. If the blank roll 10 shown in FIG. 6 is cut into a cut roll 14 having a length N and a width M represented by the division size information, according to the longitudinal and transverse unit numbers n, m as shown in FIG. 9, then longitudinal and transverse positions h, w representing failure position information of the cut roll 14 are determined, using the longitudinal position H and the transverse position W of the failure (defect) location or sampling location of the blank roll 10, as follows:

$h = n \cdot N - H$, and $w = W - (m-1) \cdot M$.

The inherent quality information of the cut roll 14 and the cutting achievement information b1 are stored in the production achievement information file 36 in a step S16.

The control computer 30 generates conveyance indication information a6 from the inherent quality information thus produced in a step S18, stores the conveyance indication information a6 in the production indication information file 34 in a step S20, and transfers the conveyance indication information a6 to the cutter 12 in a step S22. If the cut roll 14 having the inherent quality information has a failure location, then the conveyance indication information a6 comprises, as shown in FIG. 10, information "n–m" specifying the cut roll 14, information "PACKAGED PRODUCT REMOVAL" indicative of removal in a subsequent step, information "FAILURE INSPECTION" (established as data indicating that the cut roll 14 is to be inspected for a failure) indicative of a failure, and inherent print information "FAILURE" to be printed on the cut roll 14.

The cutter 14 conveys the cut roll 14 according to the conveyance indication information a6 in a step S24. The cut roll 14 is now conveyed to the internally packaging machine 16.

Then, the control computer 30 transfers the internal package production indication information a2, the print information a5, and the conveyance indication information a6 to the internally packaging machine 16 in respective steps S26, S28, S30 for controlling operation of the internally packaging machine 16.

The internally packaging machine 16 packages the conveyed cut roll 14 into a packaged product 18 in a step S32. Then, the printer 26 is operated to print the print information relative to the packaged cut roll 14 on the packaged product 18 at an internal package print location 41 (see FIG. 1) in a step S34.

The print information printed on the packaged product 18 includes, as shown in FIG. 11, the information "n–m" specifying the cut roll 14, the positional information "h–w" of a failure location in the cut roll 14, the positional information "H–W" of a failure in the blank roll 10, the inherent print information "FAILURE", and the print information a5 included in the production indication information. Specifically, the printer 26 prints the "commercial name" and the production lot number, e.g., "ABCDE12345"of the packaged product 18 based on the print information a5, and information specifying the cut roll 14 having a failure location based on the conveyance indication information a6, e.g., "01–04", failure position information in the cut roll 14, e.g., "4.5cm–135.0m", failure position information in the blank roll 10, e.g., "32.5cm–260m", and the inherent print information "FAILURE". If the cut roll 14 does not have any failure but is a sampled product for quality inspection, then the printer 26 prints "SAMPLING", for example, on the packaged product 18 according to the inherent print information included in the conveyance indication information a6. If the cut roll 14 does not have any failure or is not a sampled product for quality inspection, then the printing of only "FAILURE" and "SAMPLING" may be dispensed with.

If the destination indicated by the conveyance indication information a6 of the packaged product 18 with the above information printed thereon is the externally packaging machine 20 in a step S36, then the packaged product 18 is conveyed to the externally packaging machine 20 in a step S38. If the destination is the removal mechanism 27, then the packaged product 18 is conveyed to the removal mechanism 27 and removed thereby in a step S40.

The removed packaged product 18 is inspected for the failure location in the stored cut roll 14, the cut condition thereof, and the packaged condition thereof. If the cut roll 14 can be mended for recovery from the failure, then the inherent quality information is transferred to a joining computer 42 (see FIG. 1), which controls a joining machine 44 to mend the cut roll 14. The mended cut roll 14 is then returned to the internally packaging machine 16 which packages the cut roll 14. The conveyance indication information a6 is corrected as indicating that the mended cut roll 14 is normal, and the mended cut roll 14 which is packaged is conveyed as the packaged product 18 to the externally packaging machine 20.

When the packaged product 18 arrives at a designation indicated by the conveyance indication information a6, the internally packaging machine 16 transfers the internally packaging achievement information b2 including the inherent quality information (see FIG. 8) to the control computer 30 in a step S42. The control computer 30 stores the internally packaging achievement information b2 into the production achievement information file 36 in a step S44.

Then, the control computer 16 transfers the external package production indication information a3, the print information a5, and the conveyance indication information a6 to the externally packaging machine 20 in respective steps S46, S48, S50, for controlling operation of the externally packaging machine 20.

The externally packaging machine 20 packages the conveyed packaged product 18 into a boxed product 22 in a step S52. Then, the printer 28 is operated to print the print information relative to the packaged product 18 and print information, such as a box number, of the boxed product 22, on the boxed product 22 at an external package print location 43 (see FIG. 1) in a step S54.

The externally packaging machine 20 decides whether there is an indication for removing the boxed product 22 or not according to the conveyance indication information a6 in a step S56. If there is no indication for removing the boxed product 22, then the externally packaging machine 20 conveys the boxed product 22 as a normal boxed product in a step S58. A plurality of such boxed products 22 are classified and assembled into a palletized product 24 for shipment. If there is an indication of a failure or a sampled product with respect to the boxed product 22, then the removal mechanism 29 is actuated to remove the boxed product 22, and the removed box product 22 is inspected and mended.

When the boxed product 22 arrives at a designation indicated by the conveyance indication information a6, the externally packaging machine 20 transfers the externally packaging achievement information b3 including the inherent quality information (see FIG. 8) and the palletizing achievement information b4 to the control computer 30 in respective steps S62, S66. The control computer 30 stores the externally packaging achievement information b3 and the palletizing achievement information b4 into the production achievement information file 36 in respective steps S64, S68.

The control computer 30 transfers the production achievement information stored in the production achievement information file 36 to the production management host computer 38 in a step S70. The production management host computer 38 then transfers the production achievement information to the inspection computer 40. Based on the transferred production achievement information, the inspection computer 40 outputs to a sheet or displays on a display screen information including the name of the cut roll 14, the packaged product 18, or the boxed product 22 which has suffered a failure or has been a sampled product. The inspector can thus analyze the failure or check the quality of the product based on the information on the sheet or the display screen.

In the above embodiment, inherent quality information relative to individual cut rolls 14 is generated from the quality information of a single blank roll 10, and packaged or boxed products are removed based on the inherent quality information thus generated. If a plurality of blank rolls 10 are supplied as a continuous blank roll, the quality information of those blank rolls 10 may be reflected in the inherent quality information relative to individual cut rolls 14, and packaged or boxed products may be removed based on the inherent quality information which reflects the quality information of the blank rolls 10.

Specifically, in the photosensitive material production system, an old blank roll 10 and a new blank roll 10 may be joined into a continuous blank roll 10, and the continuous blank roll 10 may be supplied to the cutter 12. In this case, inherent quality information of a cut roll 14 which includes the blank roll joint may be generated from the quality information of the old and new blank rolls 10 and information of the blank roll joint, and supplied to the internally packaging machine 16, so that packaged or boxed products may be removed without fail even though the old and new blank rolls are joined into the continuous blank roll 10.

With the arrangement of the present invention, as described above, when a product in a certain processed state is conveyed to a next processing step, the quality information of the product is converted into quality information of a product obtained in the next processing step and provided for use. Therefore, the product can be processed in the next processing step automatically and accurately without manual intervention based on the converted quality information. For example, a product which suffers a failure or is to be sampled can automatically and accurately be removed and checked according to the quality information. Furthermore, information indicative of processed details of the product can be printed on the product according to the quality information, allowing the operator to confirm the failure location and inspect the product with ease. As a consequence, the number of operators required to attend the production line may be reduced and the production line may be made highly efficient.

Although a certain preferred embodiment of the present invention has been shown and described in detail, it should be understood that various changes and modifications may be made therein without departing from the scope of the appended claims.

What is claimed is:

1. A method of production management, comprising the steps of:
    establishing first quality information with respect to a product in a first processed state;
    generating second quality information with respect to the product in a second processed state from said first quality information when the product in the first processed state is processed into the product in the second processed state, wherein said second quality information includes conveyance indication information; and
    determining a process to be effected on the product in the second processed state based on said second quality information.
    wherein said determining step includes determining one of a plurality of destinations for the product in the second processed state in accordance with said second quality information.

2. A method according to claim 1, wherein said first quality information includes information relative to a defective portion of the product in the first processed state.

3. A method according to claim 1, wherein said first quality information includes information relative to a sampling portion of the product in the first processed state.

4. A method according to claim 1, wherein print information, based on said second quality information, is added to the product in the second processed state before the product is discharged to one of said plurality of destinations.

5. A method according to claim 1, wherein said second quality information includes information representative of whether the product in the second processed state is a defective product or a sampled product.

6. A method according to claim 1, wherein said second quality information is determined according to said first quality information and a processing condition for processing the product in the first processed state into the product in the second processed state.

7. A method according to claim 6, wherein said first quality information comprises first specified positional information of the product in the first processed state, said processing condition comprises division size information of the product in the second processed state which is produced from the product in the first processed state, and said second quality information comprises division unit number information of the product in the second processed state and second specified positional information of the product in the second processed state, which are determined from said first specified positional information and said division size information.

8. An apparatus for production management, comprising:
    first quality information managing means for managing first quality information with respect to a product in a first processed state;
    second quality information generating means for generating second quality information with respect to a product in a second processed state based on said first quality information when the product in the first processed state is processed into the product in the second processed state, wherein said second quality information includes conveyance indication information; and
    product processing managing means for managing a process to be effected on the product in the second processed state based on said second quality information.
    wherein said product processing managing means determines one of a plurality of destinations for the product in the second processed state according to said conveyance indication information.

9. An apparatus according to claim 8, wherein
    said first quality information managing means comprises a production indication information file for storing the first quality information;
    said second quality information generating means comprises a control computer for controlling said apparatus; and
    said product processing managing means comprises a production achievement information file for storing the second quality information.

10. An apparatus according to claim 8, further comprising a printer for adding print information to the product in the second processed state based on said second quality information.

11. An apparatus according to claim 8, further comprising conveyance means for conveying the product in the second processed state to a predetermined processing mechanism based on said second quality information.

12. An apparatus according to claim 11, wherein said conveyance means comprises a removal mechanism for removing a product from a processing line if the second quality information indicates that the product is defective or to be sampled.

13. An apparatus for quality control management, comprising:

a production indication information file for managing first quality information with respect to a blank roll of a photosensitive product which indicates whether a defect has been detected in the blank roll and a location of the defect within the blank roll;

a cutter for cutting the blank roll into smaller cut rolls;

a control computer for receiving said first quality information from said production indication information file wherein said control computer generates second quality information with respect to the cut rolls based on said first quality information when the blank rolls were cut into the cut rolls by said cutter; and a production achievement information file for managing a process to be effected on the cut rolls based on said second quality information.

14. The apparatus according to claim 13, wherein said production achievement information file includes conveyance information for indicating one of a plurality of destinations for the cut roll.

* * * * *